United States Patent [19]

Mancini

[11] Patent Number: 5,186,863
[45] Date of Patent: *Feb. 16, 1993

[54] HIGH DIELECTRIC SOLVENT

[75] Inventor: Thomas Mancini, Lincoln Park, N.J.

[73] Assignee: U.S. Polychemical Corporation, Spring Valley, N.Y.

[*] Notice: The portion of the term of this patent subsequent to Oct. 27, 2009 has been disclaimed.

[21] Appl. No.: 921,550

[22] Filed: Jul. 29, 1992

Related U.S. Application Data

[60] Continuation-in-part of Ser. No. 858,050, Mar. 26, 1992, Pat. No. 5,126,378, which is a division of Ser. No. 795,723, Nov. 21, 1991, Pat. No. 5,158,706.

[51] Int. Cl.$^5$ .................. H01B 3/24; H01B 3/20; B01J 1/00
[52] U.S. Cl. .................. 252/570; 134/40; 252/364; 252/578; 252/579
[58] Field of Search .................. 252/364

[56] References Cited

U.S. PATENT DOCUMENTS 5,126,378  6/1992  Mancini .................. 521/88

Primary Examiner—Morton Foelak
Attorney, Agent, or Firm—Notaro & Michalos

[57] ABSTRACT

A non-toxic chlorine and fluorine free solvent having high dielectric strength and thus being useful for cleaning electrical and electronic equipment.

5 Claims, No Drawings

HIGH DIELECTRIC SOLVENT

CROSS REFERENCE TO RELATED APPLICATIONS

The present application in a continuation-in-part application of Ser. No. 07/858,050, filed Mar. 26, 1992, which is a divisional application of Ser. No. 07/795,723, filed Nov. 21, 1991, both entitled SOLVENT FOR FOAMED PLASTIC, and now U.S. Pat. Nos. 5,126,378 and 5,158,706, respectively.

FIELD AND BACKGROUND OF THE INVENTION

Specialized solvents for cleaning motors and other electrical equipment, in particular while they are operating, are known. These solvents must have high dielectric properties to be useful without damaging the equipment or posing a danger of electrocution or fire to personnel.

Several if not all of the high dielectric solvents now used are environmentally undesirable.

Chlorinated and fluorinated components are particularly damaging to the environment and are being subjected to ever increasing Government regulation. Aromatic components are also undesirable and pose safety and fire hazards to the workers using the solvents.

Accordingly, an alternate high dielectric solvent which avoids some or all of the objectionable components would be particularly useful.

SUMMARY OF THE INVENTION

The main object of the present invention is to provide a new solvent which can be used as a high dielectric solvent for electrical and electronic applications, which avoids some or all of the chlorinated and fluorinated compounds now used in this field, and to reduce the aromatic and other objectionable compounds as well.

The high dielectric properties of the solvent have been established by testing, both by the inventor and by independent laboratories.

Known solvents, in addition to containing objectionable components, are damaging to metal parts of the electronic equipment, for example, steel parts of the equipments which may be oxidized by chlorine or fluorine mixing with moisture to form hydrochloric of hydrofluoric acid.

The solvent of the invention, by eliminating 100% of the chlorinated and fluorinated compounds, eliminates the oxidation. Environmentally this also is important.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENT

The solvent of the present invention has the following formulation which lists each ingredient in a range of percentages by weight.

| The Formulation | |
|---|---|
| Dimethyl Glutarate | 5-20% |
| Aliphatic Hydrocarbon | 30-75% |
| Dimethyl Adipate | 1-5% |
| Methyl Salicylate | 0-15% |
| Dimethyl Succinate | 1-7% |
| Dipropylene Glycol Methyl Ether | 10-40% |
| Flash Point | 161 F. (TCC) |
| Weight Per Gallon | 7.4 lbs. |

None of the components of the solvent are environmentally objectionable or toxic.

Examples of the solvents of the present invention have the following formulations in wt.%:

| | A | B | C | D |
|---|---|---|---|---|
| Dimethyl Glutarate | 9.9 | 7.3 | 6.6 | 19.8 |
| Aliphatic Hydrocarbon | 60 | 60 | 60 | 60 |
| Dimethyl Adipate | 2.6 | 1.9 | 1.7 | 5.1 |
| Methyl Salicylate | 10 | 3 | 0 | 0 |
| Dimethyl Succinate | 2.5 | 1.8 | 1.7 | 5.1 |
| Dipropylene Glycol Methyl Ether | 15 | 26 | 30 | 40 |
| TOTAL | 100 | 100 | 100 | 100 |

High dielectric strength of the solvent according to the invention, as established by laboratory tests, is as follows:

ANA Laboratories, Inc. in Bellmawr, N.J. conducted a standard dielectric ASTM test method D-877 on the four formulations of the invention identified as A, B, C and D above, and found that in every test the dielectric strength was above the 60 KV (kilovolts) level. This test comprises introducing a pair of electrodes into the sample solution and applying voltages across the electrodes in ever increasing amounts up to the 60 KV level, and a few volts above that level. No breakdown or arcing occurred at this level. This indicates the solvent has passed the high dielectric strength test.

Additional tests conducted by the inventor for the solvent or formulation A, according to the invention were as follows:

Experiment 1

A 115 volt lab stirrer motor (Model 105 of Talboys Instruments Corp., Emerson, N.J.) rated for 1,650 rpm was cleaned with the solvent. This T-line stirrer motor was run without a load for six hours under a fume hood. The motor was quite hot. A pint bottle was filled with solvent A and a trigger spray was attached. A spray mist of the solvent was sprayed onto the hot motor windings and vent holes. No fire, explosion or other unexpected adverse effects occurred, indicating the usefulness of the invention for cleaning parts of electric motors even while they are running, and due to the high dielectric strength of the solvent.

Experiment 2

A 220 volt motor (Model Centaurian, Century Electric, Inc., St. Louis, Mo.) was operated at between 208 and 230 volts and 3,400 rpm. This motor is a type CX motor and has thermal protection.

The motor was placed in the fume hood and plugged into a 220 volt outlet. The motor was allowed to run for five hours without a load. Solvent A was sprayed into the motor contacts and vents using a spray trigger bottle containing the solvent. No fire or explosion resulted indicating the usefulness of the solvent for cleaning such motors even while they are running.

Experiment 3

A hot surface test was also conducted for the solvent to determine its fuming characteristics. A spatula with a 10"×1½ blade was heated red hot over a burner flame. Under the fume hood, solvent A was sprayed onto the hot spatula using a trigger spray bottle. The solvent produces smoky looking fumes but no fire. This corresponds to other high dielectric solvents that are used in electrical and electronic applications.

One simple method of using the invention is to supply it in a hand operated spray bottle and to spray the solvent directly on a running motor or like electrical or electronic equipment. The high dielectric strength of the solvent allows it to clean the equipment within the electric or electronic environment without damage to the equipment or to the solvent.

While the specific embodiments of the invention have been shown and described in detail to illustrate the application of the principles of the invention, it will be understood that the invention may be embodied otherwise without departing from such principles.

What is claimed is:

1. A high dielectric strength solvent for use in electrical and electronic environments, comprising: about 5–20% by weight dimethyl glutarate, about 30–75% by weight aliphatic hydrocarbon, about 1–5% by weight dimethyl adipate, about 0–15% by weight methyl salicylate, about 1–7% by weight dimethyl succinate, and about 10–40% by weight dipropylene glycol methyl ether, the solvent having a dielectric strength of more than 60 KV.

2. A non-halogenated cleaning solvent for electrical equipment, comprising:
a first solvent component containing: about 5–20% by weight dimethyl glutarate, about 30–75% by weight aliphatic hydrocarbon, about 1–5% by weight dimethyl adipate, about 0–15% by weight methyl salicylate, about 1–7% by weight dimethyl succinate, and about 10–40% by weight dipropylene glycol methyl ether.

3. A solvent according to claim 2, including at least one additional solvent component comprises ethyl acetate.

4. A solvent according to claim 3, including an aromatic solvent component.

5. A solvent according to claim 2, consisting essentially of the first solvent component and the, at least, one additional solvent component.

* * * * *